United States Patent [19]

Giberson

[11] Patent Number: 5,610,500
[45] Date of Patent: Mar. 11, 1997

[54] METHOD OF CONVERTING TURBINE DRIVEN GENERATOR INTO A SYNCHRONOUS CONDENSER

[76] Inventor: Melbourne F. Giberson, 5 Spring Mill La., Haverford, Pa. 19041

[21] Appl. No.: 242,890

[22] Filed: May 16, 1994

[51] Int. Cl.⁶ ........................................................ H02P 9/00
[52] U.S. Cl. ........................... 322/100; 322/10; 310/261
[58] Field of Search ..................... 322/10, 100; 310/261; 290/1 R, 1 A, 1 C, 52

[56] References Cited

U.S. PATENT DOCUMENTS 5,315,825  5/1994  Giberson ................................. 60/336

Primary Examiner—Steven L. Stephan
Assistant Examiner—Nicholas Ponomarenko
Attorney, Agent, or Firm—Polster, Lieder, Woodruff & Lucchesi, LC

[57] ABSTRACT

A conventional turbine driven generator is converted to a synchronous condenser. The generator has a generator shaft; the turbine has a turbine shaft axially aligned with the generator shaft. The turbine shaft is disconnected from the generator shaft and an extension shaft is mounted on the generator shaft. The extension shaft has a journal bearing adjacent an axially outer end of the extension shaft, a thrust bearing, and provision for balancing the extension shaft and generator (now synchronous condenser) rotor.

19 Claims, 2 Drawing Sheets

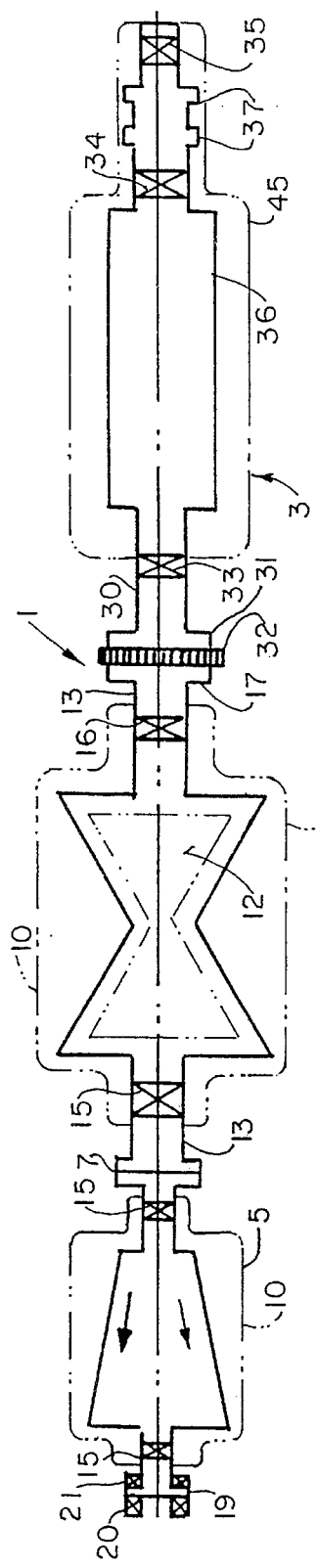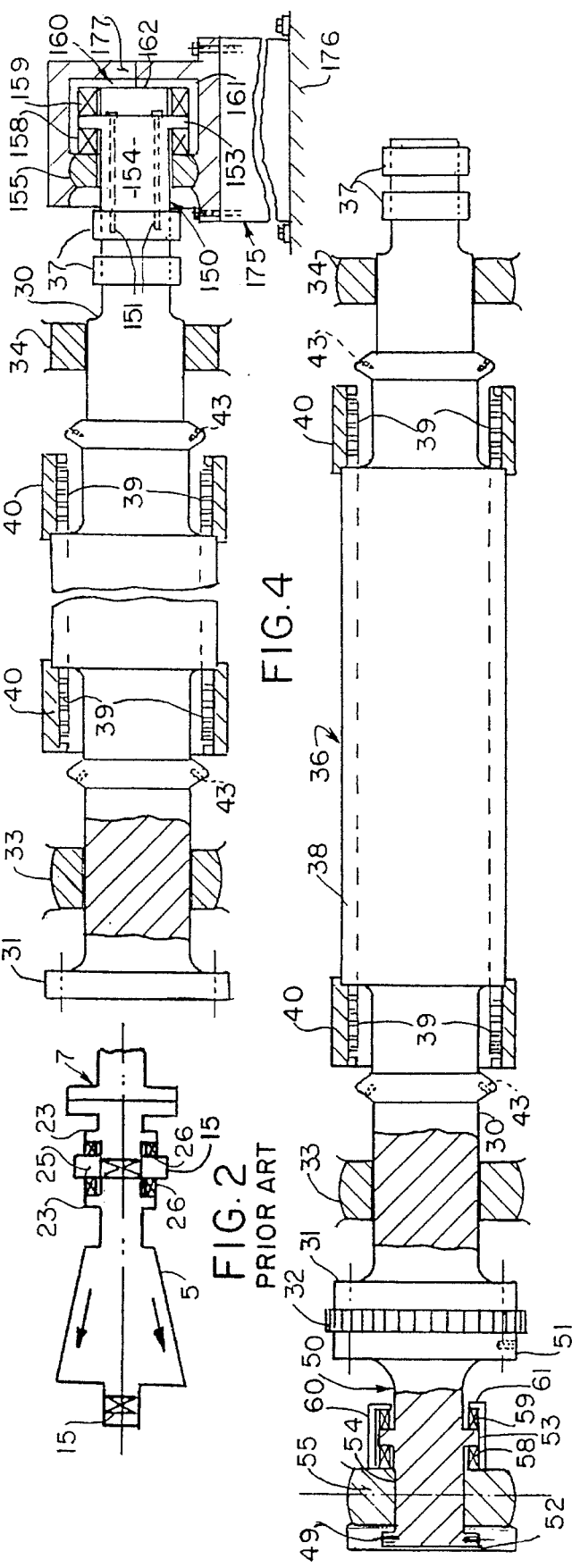

METHOD OF CONVERTING TURBINE DRIVEN GENERATOR INTO A SYNCHRONOUS CONDENSER

BACKGROUND OF THE INVENTION

Synchronous condensers are used to control the "power factor" of an alternating current network. Electric lights provide a resistive load. Electric motors typically provide an inductive load contributing to a "lagging" power factor. It is helpful to add electrical equipment to the network with a "leading" power factor to counteract the lagging power factor of the motors to bring the network power factor to unity. This optimizes the distribution of alternating current. For example, as the motor load changes, as occurs with the addition of air conditioners in response to a changing heat load throughout a summer day, it is helpful to have a way to off-set the variable lagging power factor of the air conditioning motors. Large rotating synchronous condensers provide such a method.

At present, with the introduction of many co-generating electrical generating plants and the introduction of new power plants, there are a number of older and less efficient steam-turbine generators that have been or will be shut down. In some case, these generators can be used effectively as synchronous condensers.

As a general proposition, using these generators as synchronous condensers requires that the generator be disconnected from the turbine, that a thrust bearing assembly be installed on the generator rotor shaft, that there be provided a lube oil system for lubricating the thrust and journal bearings of the synchronous condenser; that there be a way slowly to increase the speed to synchronous speed and to synchronize the generator, now a synchronous condenser, to the network, and to provide a way to vary the field current, i.e., the current through the rotating field, which varies the lead or lag power factor effect.

These conditions have been addressed heretofore, and some generators have been converted. In some generators, thrust collars have been provided on the generator shaft, axially inboard of the outer ends of the shaft, when the generator was built. No thrust bearings can be employed in such a generator when it is connected to the turbine shaft, because only one thrust bearing can be used, and that one is conventionally installed at the turbine end, not at the generator end. When the turbine is disconnected from the generator, thrust bearings can be installed, using the existing thrust collars, and this operates satisfactorily. However, most generators are not so equipped. In those, several approaches have been used. In one, a thrust runner has been bolted to the drive coupling of the generator. Thrust bearings positioned on either side of a thrust collar, are held against movement by a stationery support. However, in such an arrangement, the nearest journal bearing is a generator journal bearing substantially inboard of the drive coupling, which means that there is a substantial span between the journal bearing and the outer end of the generator shaft at which the thrust bearing is positioned. High amplitude vibration has a deleterious effect upon the life of a thrust bearing so mounted and of the generator rotor. This arrangement of the thrust bearing does little or nothing to suppress high amplitude vibration of the cantilevered end of the generator rotor.

Another approach has been to machine a groove or annular channel in the generator shaft a short distance axially inboard from the drive coupling, and to install in the channel a journal bearing flanked on each side by a thrust bearing. This arrangement reduces vibration at the thrust bearing, but it has the disadvantage that the effective diameter of the shaft is reduced, so that if the generator is again connected to the turbine, the shaft has reduced torque capability.

One of the objects of this invention is to provide a synchronous condenser made from a turbine-driven generator, that will operate dependably for long periods.

Another object is to provide such a synchronous condenser which can be reattached to a turbine to operate exactly as it did before it was used as a synchronous condenser.

Another object is to provide a method of making such a synchronous condenser.

Other objects will become apparent to those skilled in the art in the light of the following description and accompanying drawing.

SUMMARY OF THE INVENTION

In accordance with this invention, generally stated, a synchronous condenser is made from a steam turbine-driven generator. In the embodiments described, an extension shaft is provided, projecting from an end of the existing generator shaft and axially aligned with it. The extension shaft is provided with at least one thrust collar, and with means for balancing the extension shaft. A journal bearing journals the extension shaft at or near an axially outer end of the shaft. Thrust bearing assemblies, which conventionally include shimplates, are provided on the extension shaft, the journal and thrust bearing assemblies generally being in close proximity to one another, but not necessarily, and the journal bearing is used to minimize the amplitude of vibration of the generator rotor.

In the preferred embodiment, the rotor of the turbine adjacent the generator is removed and stored. An extension shaft is bolted to the drive coupling of the generator. The extension shaft has a journal section that extends into the housing of the turbine, past a seat in which a journal bearing is mounted. The journal section of the shaft is journaled in the journal bearing. A thrust bearing assembly is mounted to the journal bearing and preferably positioned between the journal bearing and the drive coupling. This arrangement has several distinct advantages. Because the journal bearing is at the axially outboard end of the generator shaft, it minimizes the vibration that might otherwise be amplified in the extended shaft. By mounting the journal bearing in the seat in which the turbine journal bearing was mounted, or by using the journal bearing of the turbine, as is, the piping for lubrication of the journal bearing is already in place, and can easily be made to accommodate the thrust bearing which generally is mounted on and immediately contiguous a radial surface of the journal bearing, although the thrust bearing may be separated. Lubricating oil piping is illustrated and described in my co-pending application Ser. No. 07/998,959, now U.S. Pat. No. 5,315,825. Because the bearing housing of the turbine-generator is massive, no additional pedestal or stand is required, and the journal bearing itself is securely anchored. Because no channel need be cut in the generator shaft itself, the shaft retains its full torque capability, so that if the turbine rotor is replaced and reconnected to the generator shaft, the generator can be put on line with no change in its operation or capacity.

In a modification of the first embodiment, if there is room between the generator and turbine, a heavy pedestal can be provided between them, on which the journal and thrust bearings are mounted. There are turbines in which a journal bearing is provided in just such a way in the original construction, and in those, no new pedestal need be provided.

In another embodiment, a modification of the first embodiment, if no journal bearing has been provided in the turbine at the generator end, an intermediate portion of the extension shaft is made generally to duplicate the mass and stiffness distribution characteristics of the rotor that has been removed and the extension shaft is provided at its end remote from the generator with a journal section which is mounted in a journal bearing in a seat in the turbine housing remote from the generator. In this case, the thrust bearing can be provided at any convenient place between the generator drive coupling and the journal bearing at which a fixed stop can be provided against which the thrust bearing can bear, although there are advantages to positioning the thrust bearing assembly against the journal bearing, as shown and described. In any case, the extension shaft is shaped as required to produce either the desired or the optimum rotor dynamic characteristics such as critical speeds and to produce an acceptable stress distribution in the rotor. In the preferred embodiment, the extension shaft may be small, perhaps several hundred pounds and only twenty or thirty inches long. In the modified embodiment, it may be large, on the order of twenty to sixty thousand pounds and eight or ten feet long, or longer, to duplicate the turbine rotor that was removed, but without any blade provisions.

In yet another embodiment, an extension shaft is secured to the collector ring end of the generator shaft opposite the turbine. The turbine rotor is either removed or separated from the generator shaft. The extension shaft is supported close to its outer end by a journal bearing, with a thrust bearing assembly immediately contiguous to it. This embodiment, like that of the suggested modification, is not preferred, because it requires a separate pedestal and provision of piping for oil supply to the bearings, which, however, can easily be arranged from existing piping. It may also require the removal of the pedestal if the system is restored to its turbine-generator function.

DRAWINGS

In the drawing:

FIG. 1 is a diagrammatic view of a steam turbine-generator, showing one conventional arrangement of thrust bearing in the turbine;

FIG. 2 is a fragmentary view of a turbine stage of FIG. 1, with another conventional arrangement of thrust and journal bearings;

FIG. 3 is a somewhat diagrammatic view, partly in section and partly broken away, of one embodiment of synchronous condenser of this invention;

FIG. 4 is a fragmentary, somewhat diagrammatic view of a second embodiment of this invention.

DESCRIPTION OF THE PREFERRED EMBODIMENT

Figure 5:
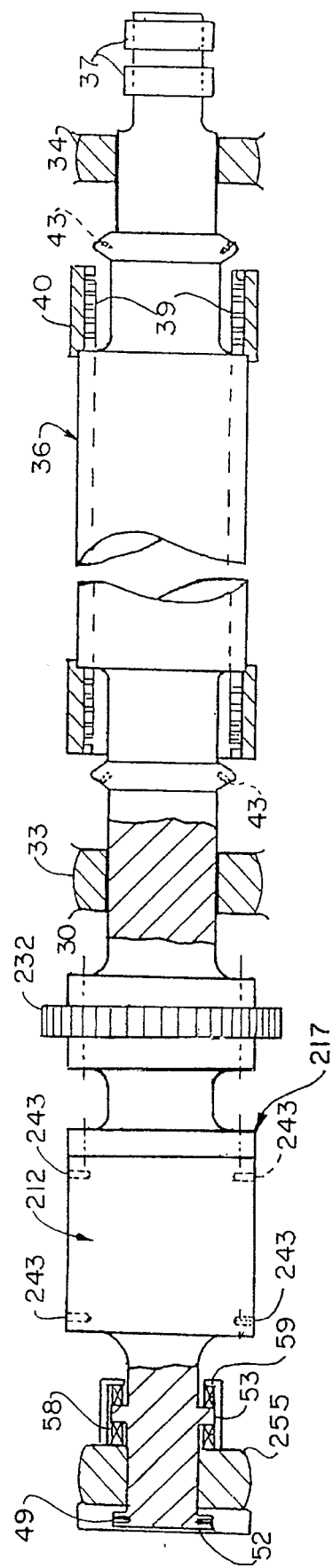
FIG. 5 is a view similar to the view in FIG. 3, showing a third embodiment of this invention.

Referring now to the drawing, FIG. 1 illustrates, diagrammatically, a steam turbine driven generator, including a multi-stage steam turbine 1 and a generator 3. In this sketch, the turbine 1 is illustrated as having only two units, a high pressure unit 5 and a double-flow low-pressure unit 6. The unit 6 is the unit closest to the generator of what are frequently in practice aligned and interconnected double-flow intermediate-pressure and a plurality of double-flow low-pressure turbines. The shafts of the turbine units 5 and 6 are connected by a coupling 7. Each of the units of the turbine 1 has a shell or housing 10, and a rotor 12 secured to a turbine shaft 13. The shafts of the turbine units are journaled in journal bearings 15, one of which, indicated by reference numeral 16, is positioned within the housing 10 close to the end of the housing 10 adjacent a turbine-generator drive coupling 17.

In the turbine 1, a conventional arrangement of thrust bearings is illustrated, in which a thrust collar 19 is external to an end journal bearing 15 of the high pressure turbine. A shimplate and thrust bearing 20 are axially outboard of the thrust collar 19, and a shimplate and thrust bearing 21 are axially inboard of the thrust collar. Both thrust bearings and thrust collar are contained in a housing, not here shown, complete with lube oil supply and drain provisions, also not shown.

The generator 3 has a housing or shell 45 with a stator core and a rotor 36, a rotor shaft 30, and a drive coupling 31 on an end of the shaft adjacent the turbine, which is bolted to the turbine-generator drive coupling 17. A bull gear or turning gear 32 is shown as provided on the generator coupling 31. This is common, but has no significance in this invention. Alternatively, the bull gear may be located on the generator shaft or the turbine shaft.

The shaft 30 is journaled in journal bearings 33, 34, and 35. The bearing 35 is not always present in existing installations. The bearing 33 is mounted between the rotor body 36 of the generator and the coupling 31. The journal bearing 34 is positioned between the rotor body 36 and collector rings 37, and the journal bearing 35 is positioned axially outboard of the collector rings 37. When the generator rotor 36 is connected to the turbine shaft 13, and a thrust bearing is provided on the turbine shaft, no thrust bearings are provided in the generator. The shaft cannot be caged between two thrust bearings spaced along it, primarily due to thermal expansion of the shaft.

In FIG. 2, another conventional thrust bearing arrangement is illustrated, in which two spaced thrust collars 23 are provided, flanking a journal bearing 15 to define thrust bearing seats on either side of the journal bearing. Shimplates and thrust bearings 26 are seated in the seats, to bear against a thrust collar 23 and a radial surface of a housing 25 of the journal bearing 15.

As has been explained heretofore, various arrangements of thrust bearings have been provided when the generator 3 is disconnected from the turbine and used as a synchronous condenser. If the generator was designed for possible use as a synchronous condenser in the initial construction, with thrust collars adjacent one of the generator journal bearings, then the conversion process is relatively easy: the turbine rotor is separated from the generator shaft, whatever housing is in place around the thrust collars of the generator rotor is disassembled, the thrust bearings are installed between the generator journal bearing and the thrust collars, and the generator is reassembled. As for the larger number of existing generators in which no provision for thrust bearings was made originally, it is believed that all of them have presented the problems outlined in the background of the invention.

Referring now to FIG. 3 for a preferred embodiment of this invention, an arrangement is provided that requires no pedestal or supporting stand, requires no machining of the generator shaft, requires no disassembly or modification of the interior of the generator, and that minimizes the vibration in the generator rotor, particularly of the cantilevered end of the rotor, containing the drive couplings. In this embodiment, the rotor 12 of the turbine unit closest to the generator is removed and stored. An extension shaft 50 has at one end a coupling 51 with the same bolt pattern as the coupling 31 of the generator, by which the extension shaft 50 is bolted to the coupling 31. The extension shaft has a smooth journal section 54 near its axially outer end, that is journaled in a journal bearing 55 mounted in the housing 10 of the turbine 1 in the seat in which the journal bearing 16 closest to the generator 3 was mounted.

A thrust collar 53 in the device illustrated is made integral with the shaft 50, between the journal bearing 55 and the coupling 51. A thrust collar can be made as a separate piece and secured to the shaft. The thrust collar 53 is spaced axially from the outer radial surface of the bearing 55 far enough to permit the mounting of a shimplate and a thrust bearing 58 between them. A shimplate and thrust bearing 59 are mounted on the side of the thrust collar 53 nearest the coupling 51. The provision of shimplates is made to permit axial adjustment of the turbine shaft, to position the rotor to operate on the magnetic center of the stator. The thrust bearings 58 and 59 are contained in and by a housing 60 connected to a radial surface of the bearing 55, as by bolting. The housing 60 has a lip 61 that restrains the thrust bearing 59, hence the rotor shaft and rotor, from moving axially in a direction away from the bearing 55.

The bearing 55 is a hydrodynamic bearing and requires a supply of oil. The piping of lubricating oil is already in place in the turbine, and can be used to ensure a supply of oil to the bearing 55, and to the thrust bearings 58 and 59. The flow of oil may need to be adjusted to suit the requirements of this application of the bearings, as compared with the requirements of the bearings when the generator is being driven by the turbine. A hydrostatic oil supply can be provided to the journal bearings to support the rotor at low rotational speeds, and separately, to the thrust bearings to restrain the generator rotor as the rotor may be mounted on a catenary curve (gravity sag line) to suit previous coupling mating requirements when the apparatus was in use as a turbine-generator. A balance ring 52 is shown as mounted on the outer end of the extension shaft. Balance pockets, usually threaded holes 49, can be provided in (a) the thrust collar 53 itself to permit the insertion of balance weights, (b) the coupling hub 51, and/or (c) in a balance ring 52 on the axially outboard side of the journal 54. In any event, each and every embodiment of extension shaft should have provision for adding weights for shop balance and/or field balance.

The synchronous condenser rotor is a conventional generator rotor, with windings in slots 38, end windings 39 restrained by retaining rings 40, and balance planes, shown here as balance rings with threaded holes 43 into which balance weights can be threaded.

As has been explained heretofore, a rotor 12 with its shaft 13 is removed from the unit of the turbine 6 closest to the generator, and stored. The extension shaft 50 is bolted to the coupling 31, with the journal section 54 extending through and journaled in the bearing 55, which can be either the original turbine shaft journal bearing, or a replacement for it. The thrust bearings 58 and 59 are mounted, and contained within the housing 60, which is secured to the journal bearing 55, the seat of which is designed for axial restraint in the turbine shell 10. The generator is then ready to be used as a synchronous condenser.

In a modification of the first embodiment, the extension shaft is journaled in a journal bearing carried by a heavy pedestal between the turbine housing and the generator. If the turbine is equipped with such a pedestal originally, no additional pedestal need be provided. Otherwise, a pedestal has to be installed. In either case, the extension shaft is journaled at a place at or near its outer end, to minimize vibration, and provided with means for installing balance weights, used to balance the entire rotating assembly.

In a second embodiment, shown in FIG. 4, an extension shaft 150 is bolted onto the collector ring end of generator shaft 30 by means of bolts 151. The extension shaft 150 has a thrust collar 153 at its axially outer end, and a journal section 154 between the thrust collar and the collector ring end of the shaft 150. The journal section 154 is journaled in a journal bearing 155, mounted in a seat in a longitudinally split casing 177 supported by a heavy pedestal 175, itself attached to a foundation 176. The journal bearing 155 is supplied with oil from piping connected to communicate with the oil supply or supplies to the bearings 34 and 33. The thrust collar 153 is spaced axially from the bearing 155 a distance to accommodate a shimplate and thrust bearing 158. Another thrust bearing, 159, and shimplate are positioned against the thrust collar on a side opposite that of the thrust bearing 158. Both bearings are contained in a housing 160, an open end of which is secured, as by bolting, to a radially extending surface of the journal bearing 155. The housing 160 which is mounted in the casing 177, has a cylindrical side wall 161 and an end wall 162, circular in plan, forming an enclosure and preventing moving of the thrust bearing, hence the generator shaft, axially outwardly. In this embodiment, as in the first embodiment, the positioning of a journal bearing close to the outer end of the extension shaft, and the thrust bearings immediately contiguous the journal bearing, minimizes vibration of the shaft at its cantilevered end, thus reducing wear of the thrust bearings and damage to the generator rotor. It will be observed that in this embodiment, the turbine can be left untouched, separated from the generator shaft, and if it is desired to reconvert the generator and turbine to their original condition, it is only necessary to re-connect the turbine shaft and generator shaft, and to remove the extension shaft thrust bearings, although the entire extension shaft and/or the pedestal may be removed if desired.

In all of the embodiments, all of the journal bearings are of the hydrodynamic type, although they may have a hydrostatic feature to accommodate slow rotation of the shaft. Such a feature does not defeat the hydrodynamic operation. Both the thrust and journal bearings are preferably of tilting pad design. For example, the journal bearing can be of TRI Align-A-Pad® design, which can maintain triple axis alignment between the bearing pads and the journal even while the rotor is rotating and vibrating. The thrust bearings can be of the Kingsbury type, with fully equalizing load capability as is accomplished by means of leveling plates.

Referring now to FIG. 5 for a third embodiment, an arrangement is shown in which the turbine journal bearing is provided in the turbine at a far end of the turbine rotor nearest the generator. That turbine rotor is removed, and a cylindrical dummy turbine rotor 212, forming part of the extension shaft, is bolted to a coupling 217 of generator shaft 30. In the illustration, a bull gear 232 is shown as being separated from the coupling, but as has been pointed out, the bull gear forms no part of this invention, and can be located at any convenient place. In this embodiment, a turbine journal bearing 255 is located at the end of the turbine rotor remote from the generator. Beyond the dummy turbine rotor, the journal bearing 255, the balance ring 52 with balance weight pockets 49, usually threaded holes, and the thrust collar 53 and the thrust bearing assembly, including thrust bearings 58 and 59, are the same as those of the first embodiment. As in the first embodiment, the thrust bearing assembly normally includes shimplates, which are not illustrated, but are well known in this art. The dummy turbine rotor 212 is of comparable mass and stiffness distribution with the replaced turbine rotor, but has no blades or buckets. It is shown as provided with balance weight pockets 243, which are shown as extending radially. They can also be oriented axially, into a radial end wall of the dummy rotor 212 near its circumference.

Numerous variations in the construction of the synchronous condenser of this invention will occur to those skilled in the art in the light of the foregoing disclosure. Merely by way of example, either two thrust collars or an annular channel in which a journal bearing can be seated, flanked by thrust bearings, can be provided, in a way similar to that shown in FIG. 2. In the latter arrangement, the radially extending surfaces defining the axial limits of the channel constitute the thrust collars. If a generator is available for movement to a new location independent of the turbine to which it was connected or if the turbine is removed, the cantilevered end of the generator shaft can still advantageously be supported by an extension shaft and journal bearing, and a thrust bearing can be installed at either end, as in the embodiments illustrated and described. These are merely illustrative.

Having thus described the invention, what is claimed and desired to be secured by Letters Patent is:

1. A method of making a synchronous condenser from an electric generator driven by a steam turbine, said generator having a generator shaft and said turbine having a turbine shaft axially aligned with said generator shaft, said turbine shaft being connected to said generator shaft when said generator is driven by said turbine, said method comprising disconnecting said generator shaft from said turbine shaft, mounting an extension shaft on an end of said generator shaft coaxially and concentrically with said generator shaft to project axially outwardly from said generator, journaling said extension shaft in a journal bearing mounted against axial and radial movement with respect to the extension shaft, said extension shaft being journaled adjacent its axially outer end, mounting a thrust bearing assembly on said extension shaft, providing on said extension shaft means for balancing said extension shaft and generator shaft, and balancing said extension shaft and generator shaft.

2. A method of making a synchronous condenser from a turbine-driven electric generator said generator having a generator shaft and said turbine having a housing, a turbine shaft rotatably mounted in said housing, said turbine shaft being axially aligned with said generator shaft and a turbine rotor mounted on said turbine shaft, said turbine shaft being connected to said generator shaft when said generator is driven by said turbine, said method comprising removing said turbine shaft and rotor from said turbine housing, mounting an extension shaft on a drive coupling on said generator shaft to project toward and into said turbine housing, journaling said extension shaft in a journal bearing mounted in said turbine housing, and mounting a thrust bearing assembly around said extension shaft near an axially outer end thereof.

3. The method of claim 1 including providing on said extension shaft an annular thrust collar and mounting thrust bearing assemblies on either side of said thrust collar.

4. The method of claim 1 including providing two thrust collars on said extension shaft, one on either side, axially, of said journal bearing, and mounting a thrust bearing assembly on either side of said journal bearing in a space between said journal bearing and said thrust collar.

5. The method of claim 1 wherein the turbine journal bearing is at an end of the turbine rotor that has been removed remote from the generator, the method including providing on said extension shaft intermediate the generator and the turbine journal bearing seat an intermediate portion that approximates the mass and stiffness distribution of the replaced turbine rotor, but has no provision for turbine blades.

6. A synchronous condenser converted from a turbine-driven generator, said generator having a generator shaft, a turbine being in place adjacent to and having a turbine shaft axially aligned with said generator shaft, said turbine having a housing, said turbine shaft being disconnected from said generator shaft, an extension shaft mounted coaxially and concentrically to an end of said generator shaft, said extension shaft having a journal section adjacent an end of said extension shaft axially outward from said generator, thrust collar means on said extension shaft, a journal bearing mounted against movement, said journal section being mounted in said journal bearing, and balance means on said extension shaft.

7. The synchronous condenser of claim 6 wherein said generator shaft has a coupling end and a collector ring end, and said extension shaft is mounted to the collector ring end.

8. The synchronous condenser of claim 6 wherein a rotor has been removed from said turbine, said turbine rotor being one that had been adjacent the generator, said extension shaft extends into said turbine housing, and said journal bearing is seated in a journal bearing seat in said housing.

9. The synchronous condenser of claim 8 wherein the journal bearing seat is at an end of said turbine housing adjacent the generator.

10. The synchronous condenser of claim 8 wherein the journal bearing seat is at a part of said turbine housing in which an end of said turbine rotor remote from said generator was positioned.

11. The synchronous condenser of claim 10 wherein the extension shaft has a part between the generator and the journal section of the extension shaft of approximately the mass and stiffness distribution of the turbine rotor that has been removed.

12. A synchronous condenser converted from a turbine-driven generator, a turbine being in place adjacent to and axially aligned with said generator, said turbine having a housing but no rotor at an end adjacent said generator, said condenser comprising a generator shaft with a drive coupling by which it was coupled to a turbine shaft, an extension shaft having a coupling complementary to said generator shaft drive coupling and connected thereto, a journal section on said extension shaft axially outward from said coupling with respect to said generator, and thrust collar means positioned axially inwardly from said journal section, and a journal bearing mounted in said turbine housing, said extension shaft journal section being journaled in said journal bearing.

13. The synchronous condenser of claim 12 wherein the thrust collar means comprise two annular thrust collars, spaced axially along said extension shaft sufficiently to accommodate between them a journal bearing and thrust bearings flanking said journal bearing.

14. The synchronous condenser of claim 12 wherein the thrust collar means comprise a single annular thrust collar spaced axially inwardly toward said generator sufficiently to accommodate a thrust bearing assembly mounted against a radial wall of said journal bearing, and a second thrust bearing assembly mounted against an axially inward side of said thrust collar.

15. A synchronous condenser converted from a turbine-driven generator, said generator having a generator shaft, a turbine having a turbine shaft adjacent to and axially aligned with said shaft of said generator, said synchronous condenser having an extension shaft coaxial with said generator shaft and projecting from an end thereof, said extension shaft having a journal section, a fixed journal bearing close to the outer end of said extension shaft in which said journal section is journaled for rotation, thrust collar means on said extension shaft spaced from said journal bearing, thrust bearing means mounted on said extension shaft adjacent said thrust collar means, and means for balancing said extension shaft.

16. The synchronous condenser of claim 15 wherein said extension shaft is mounted on an end of said generator remote from said turbine, and a pedestal is provided to support said journal bearing and said thrust bearing.

17. The synchronous condenser of claim 15 wherein said extension shaft is mounted on an end of said generator shaft adjacent said turbine, and extends into a journal bearing seated in a housing of said turbine.

18. In a synchronous condenser converted from a turbine driven generator, said condenser having an elongated shaft, a coupling end of which is cantilevered axially outboardly from a first journal bearing, the improvement comprising an extension shaft coaxial with and extending axially outboard from said coupling end and fixed to said coupling end, and an outboard journal bearing mounted to embrace and support said extension shaft at an axially outboard end thereof, outboardly of said first journal bearing.

19. The improvement of claim 18 wherein said generator shaft has a collector end opposite said coupling end, and a thrust bearing mounted at said collector end.

* * * * *